Patented July 18, 1950

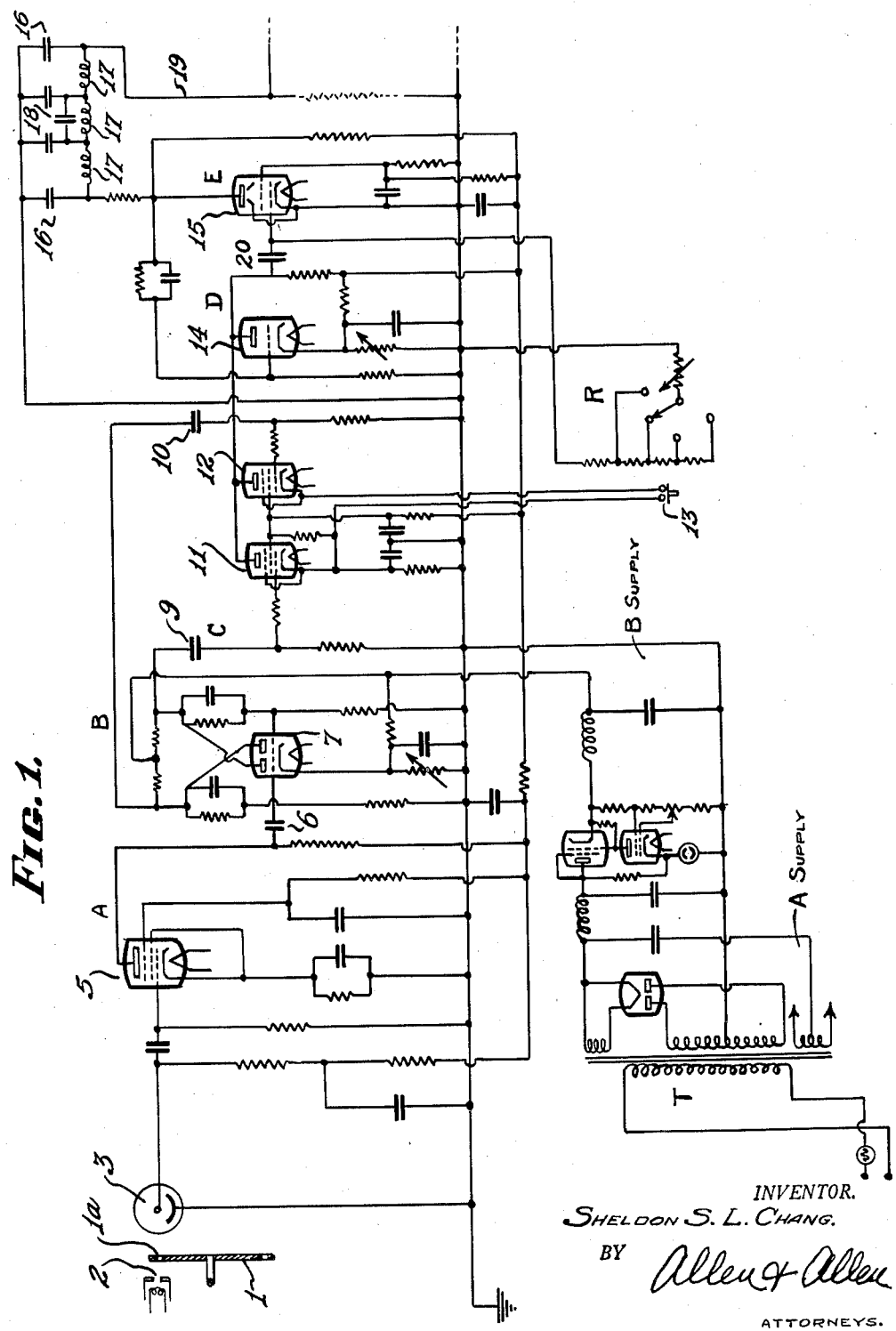

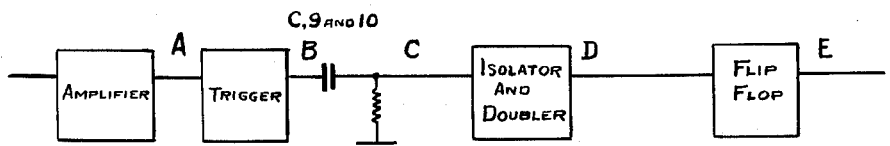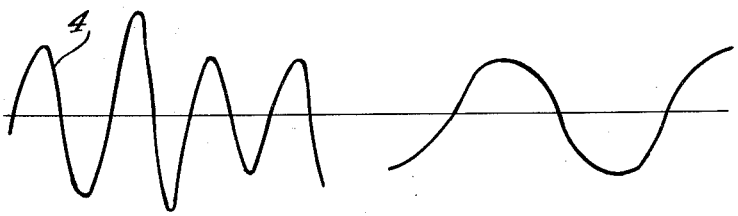

2,515,630

UNITED STATES PATENT OFFICE 2,515,630

PHOTOSENSITIVE CELL ELECTRONIC SYSTEM

Sheldon S. L. Chang, Springfield, Ohio

Application March 26, 1947, Serial No. 737,329

7 Claims. (Cl. 250—214)

My invention is a new type of frequency discriminator which when stimulated by an alternating input electric current produces a series of unidirectional electric pulses, the magnitude and duration of each pulse being a constant independent of the input current, while the frequency of occurrence of such pulses is either the same, or a small multiple of the frequency of the input electric current. These pulses, after being smoothed out by an electric wave filter, result in a D. C. voltage which is in strict proportion to the frequency of the input current.

The principal objectives are:

1. To produce a D. C. voltage which is in strict proportion to the frequency of the input current with such linear relationship extended down to zero input frequency.
2. To eliminate the effect of the intensity and wave form of the input electric current upon the magnitude of the output D. C. voltage, and
3. To obtain an instantaneous response between the output electric pulse and the input electric pulse so that any time delay between the frequency of the input electric current and the output voltage is entirely introduced in the electric wave filter.

The utility of the device lies in the use of the same, as a frequency discriminator in any frequency modulation communication system, and in the use of the same in conjunction with a photosensitive cell whose circuit is interrupted by a moving part to produce a D. C. voltage which is free of ripple and is proportional to and responds instantaneously to the speed of the moving part. This voltage, or the unfiltered voltage impulses, may be used for deflecting the cathode ray beam of an oscilloscope or for operating indicating or recording instruments of other types. One use for which the device has been employed is in indicating by a cathode ray oscilloscope the speed of the rotor shaft of an electric motor as one component while providing a second component which is dependent upon the change or acceleration in speed of rotation of said shaft, the two components being used to deflect the cathode ray of an oscilloscope to produce a curve on the tube face from which torque of a motor at various speeds may be read.

In a companion application, Serial No. 937,328, filed of even date herewith, I have described the circuit connections for this last noted use of the device of the present invention. However, my present invention may be used wherever it is desired to deliver a series of unidirectional voltage pulses of constant magnitude and duration per pulse, repeating at a rate which is equal to the frequency of an electric signal or is proportional to the speed of some moving part, of which the delivering of a D. C. voltage in proportion to the frequency of an A. C. signal, or the speed of an accelerating motor are but some of the uses.

In the drawings I have shown a complete wiring diagram for the preferred form of my apparatus including power supply source for the amplifiers and wave form changers of my arrangement, using a photoelectric tachometer. However, without the photosensitive cell the same circuit can be used as a frequency discriminator.

In the claims that follow will be set forth the novelty in devices of the nature of that which will be described in accordance with this diagram.

In the drawings:

Figure 1 is a diagram of the device of my invention from which the principles thereof may be obtained.

Figure 2 is a line diagram to indicate the points in the system where the wave form generated will be seen as shown in the ensuing figures.

Figures 3, 4, 5, 6 and 7 are the wave forms in the various stages of my device.

As a typical source of electric impulses upon which my device operates, I have indicated in Figure 1 a disc 1, which has a series of holes in its periphery, as indicated at 1a, which disc rotates between a light beam from point 2, and a photosensitive cell indicated at 3. If the rotating disc is coupled to the shaft of a motor being tested, or any other rotary member, the R. P. S. thereof times the number of holes in the disc will measure the interruption of light applied to the cell and of the frequency of discharge of the said cell. A typical wave form of the discharge of such cell may be seen in Figure 3, in which the wave is shown at 4. The rather extreme variations are due to the slight inaccuracies in connection with the holes in the disc as the chief factor.

The first stage of the frequency discriminating system of my invention may embody an electronic tube 5, connected so as to act as an amplifier. The discharge from this amplifier will be in a repetition of the original wave form such as is indicated by the line in Figure 3. The output of this tube 5 is coupled by a condenser 6, with what is known as a trigger circuit. This amplifier stage also isolates the trigger circuit from the input circuit, which may be a photoelectric cell, a converter, or an intermediate frequency amplifier in case this device is used as a frequency discriminator.

The trigger circuit consists of an electronic tube 7, with twin triode units which serve to deliver to point B on the diagram an alternating voltage of square wave form. The fundamental frequency of the square wave voltage is the same as the frequency of the input signal. The formation of the square wave form is necessary in order to obtain the sharp pulses by differentiation.

The output of this trigger circuit is differentiated to form sharp pulses by condensers 9 and 10. These sharp pulses are applied to the grid circuit of one or a pair of pentode amplifiers 11 and 12, which are operated at a negative grid bias considerably higher than its cut-off value. The plate voltage takes its minimum value in the presence of a positive voltage pulse on the grid, but is unaffected by small voltage variations. Furthermore the capacitants between the grid and plate of a pentode tube is very low. As a result this amplifier isolates the ensuing flip-flop circuit completely from external disturbances except at the instant that it conveys a sharp pulse to the latter. Such complete isolation leaves the flip-flop circuit to operate alone, so that dependable constancy in the output pulses are achieved.

The discharge from this isolating circuit is coupled to an arrangement of tubes known as a "flip-flop" circuit in high frequency communication work. Tube 14 is operated at a negative grid bias higher than cut-off value and tube 15 is operated at zero grid bias. Without any excitation these two tubes remain at their normal conditions. When stimulated by a negative pulse voltage on the grid of tube 15 they undergo a series of change and then return to the normal condition. This we shall refer to as a working cycle. During each working cycle the tube 15 is cut-off and the tube 14 is conducting for a while the duration of which is determined by the time of discharge of the condenser 20 through the resistance R connected between the grid of tube 15 and ground. As this duration can be affected to a considerable degree by the introduction of an external voltage on the grid of tube 15 during the working cycle, the isolating function of tubes 11 and 12, as well as the formation of sharp pulses as shown in Fig. 6, are of paramount importance to the constancy in magnitude and duration of the output pulses. During each working cycle, the grid voltage of tube 15 also stays positive for a while. In order to make the output pulses unidirectional the tube 15 is operated under such condition that its plate current is not affected by a positive grid voltage.

The cathode currents of the various tubes are all well below its normal emissivity, so that a variation in A supply voltage would not affect the operation of this device. The B supply is regulated to a tenth of a volt.

Figures 3, 4, 5, 6, 7, are the observed wave form of voltages at A, B, C, D, E, respectively. If a single tube instead of a double arrangement is used in the isolating stage, the number of pulses will be reduced to half at Figures 6 and 7. The contrast of the left and right of these figures show the effect of a change in frequency.

The characteristic of this frequency discrimination system is that the input signal serves merely as a stimulation to liberate a series of pulses created in the device itself rather than being amplified and reformed. As a result the output depends only on the frequency of the input signal and is completely independent of its amplitude and wave form. Its linearity is perfect and extends down to zero frequency. Its maximum average output voltage is about half the B supply voltage. All these points make it compare favorably with the conventional frequency discriminators.

The output is a series of voltage pulses of equal magnitude and equal duration, the only variable being the frequency. This frequency is either the same or a multiple of the frequency of the input signal into the system. In other words, what is produced is a series of voltage pulses of which the only variable is frequency.

These voltage pulses can be used for various purposes, but the main purpose will be to produce a steady voltage therefrom which reflects in its magnitude the frequency of the input signal. In connection with testing an electric motor, for example, about as many perforations in the disc which may be used to impose an oscillating current through the photocell is 180 perforations, taking into consideration the maximum R. P. M. of the motor. By the circuit now described this can be multiplied into twice the number. Hence we have a large number of voltage impulses, each of them equal in magnitude and amplitude and varying only in number of impulses per unit of time, where the motor under test is accelerating or decelerating.

The impulses from the photoelectric cell are quite irregular due to unavoidable variations in the holes which are placed in the rotating disc which cooperates with the light slit and the cell, and all of this is smoothed out except for frequency alone, which, and only which, is a measure of the speed. The several elements of the system as so far described give an instantaneous response.

The ripple filter consists of a series of condensers and inductances arranged as shown, the effect of which is to smooth out the gaps between impulses, and which is substantially without fluctuation or ripple, at the delivery point, and the more frequent the impulses the larger is the magnitude of the output voltage as an average. In this filter a series of condensers 16 are connected in parallel with intervening inductances 17, and the two middle condensers are connected by a condenser 18. The voltage at the output line 19 is one which varies in magnitude with the variation in frequency of the input impulses, in a perfect linear fashion. This voltage can then be used to operate instruments which are to give a reading of speed of the element tested and its acceleration on the theory that voltage generated by rotating element varies as the speed thereof. A cathode ray tube can be employed, as set forth in my co-pending application, to form a ray picture on its target which contains two components, viz: the speed of the motor tested, and its acceleration, which gives a figure for the torque of the motor at its various speeds.

The ripple filter is conventional in behavior, except that it is provided with impulses which vary in frequency only, and the particular electronic devices which bring about the several changes in wave form are of conventional design as instrumentalities to obtain the results noted. Accordingly, there has been no attempt made to explain how each one of the devices operates and why. In connection with motor testing, it may be noted that the voltage in the output of the ripple filter corresponds with the average voltage which would be produced by a D. C. generator connected as a tachometer with the rotor shaft of the motor under test.

Having thus described my invention, what I claim as new and desire to secure by Letters Patent is:

1. A voltage speed measuring device which comprises a photosensitive cell upon which is impressed an interrupted light beam which is interrupted in accordance with speed of a device tested, an electronic device so arranged as to convert the electrical waves generated by the interruption of said light beam into waves of strictly uniform magnitude and strictly rectangular conformation, a capacity coupling which converts said uniform magnitude waves into sharp pulses, and a flip-flop circuit which converts said sharp pulses into pulses of strictly equal duration throughout, whereby a pulsating D. C. voltage is delivered, the average magnitude of which is directly proportional to the speed, and which consists of a series of impulses which vary in frequency but not in magnitude or duration.

2. The device of claim 1 together with a filter arranged to deliver a constant voltage of magnitude varying with frequency of the last noted impulses.

3. The device of claim 1 in which a rectifier is introduced between the capacity coupling and the flip-flop circuit.

4. The device of claim 1 in which a pulse doubler is introduced between the capacity coupling and the flip-flop circuit, said doubler so arranged as to produce a unidirectional discharge.

5. A voltage speed measuring device which comprises a photosensitive cell upon which is caused to impinge a light interrupted in accordance with the speed of movement of a device under test, means for amplifying the voltage produced by the cell, means for rendering the amplified current into a unidirectional interrupted current, of strictly uniform voltage per impulse, means having high grid bias to act as a shield and for converting the impulses into pulses without measurable duration and means for altering said pulses to pulses of a strictly equal duration each.

6. In a device of the character described photosensitive cell voltage generating means energized by an interrupted light beam, means for converting the voltage impulses to unidirectional impulses of strictly constant magnitude and duration, and a ripple filter, arranged to convert the voltage impulses into a voltage which increases in magnitude in strict proportion to the frequency of the said voltage impulses.

7. The device of claim 6 in which a stage of amplification is introduced between the photosensitive cell and the converting means in which the grids are heavily biased so as to act as a shield.

SHELDON S. L. CHANG.

REFERENCES CITED

The following references are of record in the file of this patent:

UNITED STATES PATENTS

| Number | Name | Date |
|---|---|---|
| 1,854,949 | Mead, Jr. | Apr. 19, 1932 |
| 1,871,404 | Brown | Aug. 9, 1932 |
| 1,957,681 | Thompson | May 8, 1934 |
| 2,113,214 | Luck | Apr. 5, 1938 |
| 2,262,407 | Rath | Nov. 11, 1941 |
| 2,286,377 | Roberts | June 16, 1942 |
| 2,323,596 | Hansell | July 6, 1943 |
| 2,366,076 | Wilbur | Dec. 26, 1944 |
| 2,373,145 | Sensiper et al. | Apr. 10, 1945 |
| 2,403,984 | Koenig, Jr., et al. | July 16, 1946 |